United States Patent
He et al.

(10) Patent No.: US 10,208,921 B1
(45) Date of Patent: Feb. 19, 2019

(54) HIGH-REFLECTIVITY REFLECTOR MANUFACTURING METHOD AND HIGH-REFLECTIVITY LAMP

(71) Applicant: Shenzhen Thousandshores Technology Co., Ltd., Shenzhen, Guangdong (CN)

(72) Inventors: Ding He, Guangdong (CN); Lei Zhou, Guangdong (CN)

(73) Assignee: Shenzhen Thousandshores Technology Co., Ltd., Shenzhen (CN)

(*) Notice: Subject to any disclaimer, the term of this patent is extended or adjusted under 35 U.S.C. 154(b) by 0 days.

(21) Appl. No.: 15/742,050

(22) PCT Filed: Aug. 2, 2017

(86) PCT No.: PCT/CN2017/095703
§ 371 (c)(1),
(2) Date: Jan. 5, 2018

(51) Int. Cl.
| | |
|---|---|
| F21V 7/04 | (2006.01) |
| F21V 7/24 | (2018.01) |
| B29C 41/02 | (2006.01) |
| B29C 41/46 | (2006.01) |
| B29L 31/00 | (2006.01) |
| B29K 105/00 | (2006.01) |
| B29K 105/04 | (2006.01) |
| B29K 67/00 | (2006.01) |

(52) U.S. Cl.
CPC ............ *F21V 7/041* (2013.01); *B29C 41/02* (2013.01); *B29C 41/46* (2013.01); *F21V 7/24* (2018.02); *B29K 2067/003* (2013.01); *B29K 2105/0044* (2013.01); *B29K 2105/041* (2013.01); *B29K 2995/003* (2013.01); *B29L 2031/747* (2013.01)

(58) Field of Classification Search
CPC . F21V 7/041; F21V 7/24; B29C 41/02; B29C 41/46
See application file for complete search history.

(56) References Cited

U.S. PATENT DOCUMENTS

| | | | | |
|---|---|---|---|---|
| 9,908,300 | B2* | 3/2018 | Ikeda | B32B 5/18 |
| 2007/0045888 | A1* | 3/2007 | Lee | B29C 44/348 |
| | | | | 264/45.9 |
| 2008/0158663 | A1* | 7/2008 | Hsu | C09D 5/32 |
| | | | | 359/359 |
| 2014/0322505 | A1* | 10/2014 | Ikeda | B32B 5/18 |
| | | | | 428/215 |

* cited by examiner

*Primary Examiner* — Thomas M Sember

(57) ABSTRACT

Disclosed are a high-reflectivity reflector manufacturing method and a high-reflectivity lamp. The high-reflectivity reflector manufacturing method includes (A) preparing at least one micro foaming reflection plate processed with an anti-UV process; (B) performing a preheat process of the micro foaming reflection plate; (C) performing a heating process of the micro foaming reflection plate after being processed by the preheat process to soften the micro foaming reflection plate; (D) performing a hot pressing process to the softened micro foaming reflection plate to form a required shape of the reflector; and (E) cooling the reflector to obtain a high-reflectivity reflector. The present disclosure significantly improves the light reflectivity up to 95%~99% as well as improving the lamp brightness.

8 Claims, 2 Drawing Sheets

HIGH-REFLECTIVITY REFLECTOR MANUFACTURING METHOD AND HIGH-REFLECTIVITY LAMP

FIELD OF THE INVENTION

The present disclosure relates to the technical field of lamps, in particular to a high-reflectivity reflector manufacturing method and a high-reflectivity lamp.

BACKGROUND OF THE INVENTION

As the lamp technology advances, there are a wide variety of lamp products on the market. In general, most lamps come with a reflector for reflecting the light emitted from a light emitting source inside the lamp. Although a lamp cover can reflect the light of the light emitting source, most reflectors used for the lamps have a reflective material coated onto a PC reflector by electroplating, so that the reflectivity of the lamp cover becomes lower, and the overall luminous efficiency of the light emitting source becomes lower, the brightness of the light outputted from the lamp becomes weaker, and the user requirements cannot be met.

In view of the drawbacks of the prior art, it is necessary to improve the conventional reflectors.

SUMMARY OF THE INVENTION

Therefore, it is a primary objective of the present disclosure to provide a high-reflectivity reflector manufacturing method to overcome the aforementioned drawbacks of the prior art.

To achieve the aforementioned and other objectives, the present disclosure provides a high-reflectivity reflector manufacturing method, comprising the following steps A~E:

A. Prepare at least one micro foaming reflection plate processed with an anti-UV process.

B. Perform a preheat process of the micro foaming reflection plate.

C. Perform a heating process of the micro foaming reflection plate after being processed by the preheat process to soften the micro foaming reflection plate.

D. Perform a hot pressing process to the softened micro foaming reflection plate to form a required shape of the reflector.

E. Cool the reflector to obtain a high-reflectivity reflector.

In a specific embodiment, the preheat process in Step B has a temperature of 180~200° C., and a continuous preheat time of 10 seconds.

In a specific embodiment, the heating process in the Step C has a temperature of 230~250° C., and a continuous heating time is 5 seconds.

In a specific embodiment, the Step D further comprises the step of placing the softened micro foaming reflection plate into a hot pressing mold for the hot pressing process to form a required shape of the reflector, wherein a cavity of the micro foaming reflection plate is formed inside the hot pressing mold.

In a specific embodiment, the Step D further comprises a preheat process to heat the hot pressing mold to 230~250° C.

In a specific embodiment, an anti-UV agent is added into a MCPET material to form a synthetic micro foaming sheet in the anti-UV process of the Step A, wherein the MCPET material and the anti-UV agent have a weight ratio of 50000:1.

In a specific embodiment, the high-reflectivity reflector has a cross-sectional shape which is a square shape, a circular shape, and another other shape, and the reflector has an overall shape of a cone.

To achieve the aforementioned and other objectives, the present disclosure further provides a high-reflectivity lamp comprising a lamp housing with an accommodating space, a light board installed in the lamp housing, at least one light emitting source installed on the light board, and a reflector disposed in the lamp housing and covered onto the light emitting source, and the reflector is manufactured according to the aforementioned high-reflectivity reflector manufacturing method.

The technical solution of the present disclosure provides a micro foaming reflection plate processed by an anti-UV process and preheats the micro foaming reflection plate and then heats and softens the micro foaming reflection plate, and the micro foaming reflection plate going through the hot pressing process is formed into the shape of a reflector, and finally the reflector is formed after a cooling process. Compared with the prior art, most conventional reflectors have a reflective material electroplated onto the reflectors. Therefore, the light cannot be reflected effectively, and thus resulting in a low light efficiency and a reflectivity less than 90%. In the present disclosure, a micro foaming reflection plate processed by an anti-UV process is used for making a reflector, and the reflectivity will reach up to 95%-99%, and the light efficiency can be improved significantly to enhance the lamp brightness. In addition, the micro foaming reflection plate processed by the anti-UV process can improve the service life of the reflector.

BRIEF DESCRIPTION OF THE DRAWINGS

The above and other objects, features and advantages of this disclosure will become apparent from the following detailed description taken with the accompanying drawings. Only some embodiments of the present disclosure have been illustrated in the drawings, but it should be pointed out that many other modifications are conceivable within the scope of the following claims.

DESCRIPTION OF ILLUSTRATED EMBODIMENTS

It should be understood that the terms used in this specification and claims such as "first" and "second" are provided for the purpose of illustrating this disclosure, but not intended for indicating or implying their relative importance or indicating the quantity of a specific element. Therefore, the characteristic with the limitation of the "first" or "second" may indicate or imply the characteristic of having at least one element. In addition, the technical solutions of different embodiments may be combined, but such combination must be able to be implemented by persons having ordinary skill in the art. Such combination will be considered to be non-existent if it is contradictory or unable to be implemented and is not to be covered in the scope of the present disclosure.

Embodiment 1

Figure 1:
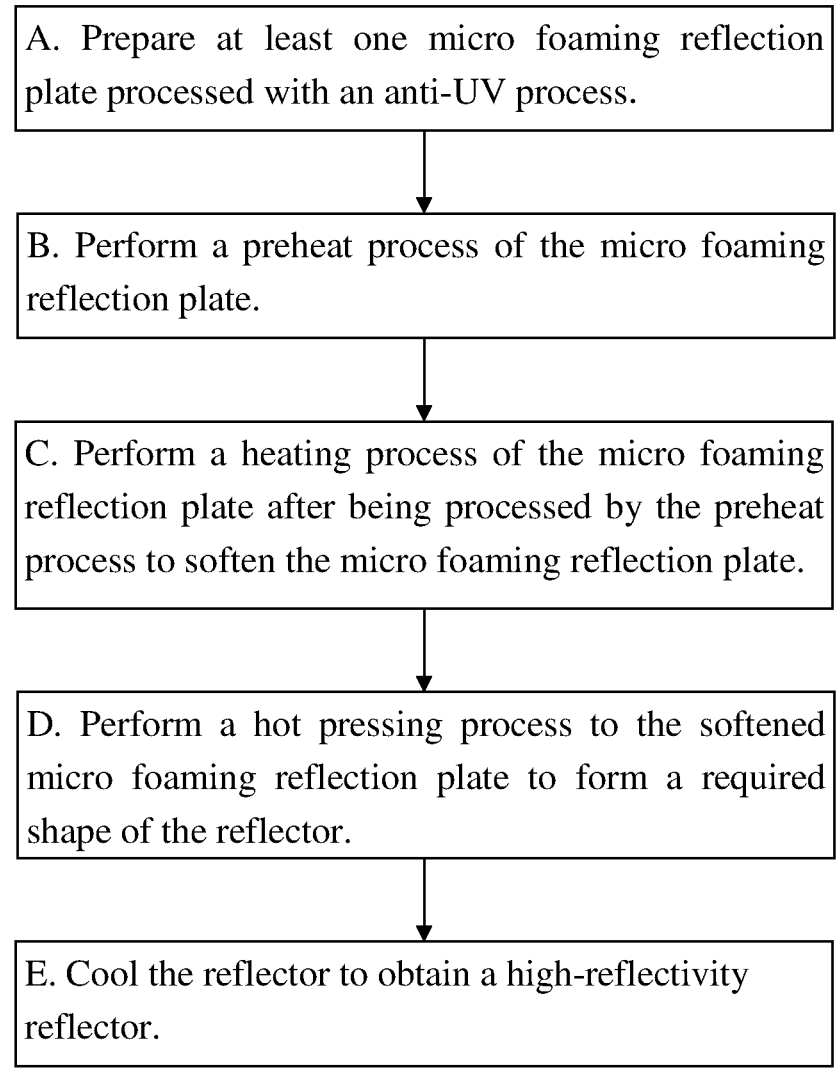
FIG. 1 is a flow chart of a high-reflectivity reflector manufacturing method in accordance with an embodiment of the present disclosure.

With reference to FIG. 1 for a high-reflectivity reflector manufacturing method in accordance with an embodiment of the present disclosure, the high-reflectivity reflector manufacturing method comprises the following steps A~E:

A. Prepare at least one micro foaming reflection plate processed with an anti-UV process.

B. Perform a preheat process of the micro foaming reflection plate.

C. Perform a heating process of the micro foaming reflection plate after being processed by the preheat process to soften the micro foaming reflection plate.

D. Perform a hot pressing process to the softened micro foaming reflection plate to form a required shape of the reflector.

E. Cool the reflector to obtain a high-reflectivity reflector.

In the Step A of this embodiment, the micro foaming reflection plate is made of a micro cellular polyethylene terephthalate (MCPET) material. The micro foaming reflection plate is a crystallized C with high heat resistance. Since the micro foaming reflection plate of the present disclosure is processed with an anti-UV process, a small quantity of anti-UV agent is added during the manufacture, so that the formed material can last long and will not be deformed or discolored, and the durability will be improved. The preheat process of the Step B not just prevents heating the micro foaming reflection plate to a high temperature directly and shortens the high-temperature softening time only, but also facilitates the operation of the micro foaming reflection plate for an easy fixing and cutting operation. The heating process of the Step C primarily softens the micro foaming reflection plate to facilitate the subsequent hot pressing process, and presses the micro foaming reflection plate into a predetermined shape, and finally the reflector is cooled to form a high reflectivity reflector.

The technical solution of the present disclosure provides a micro foaming reflection plate processed by an anti-UV process and preheats the micro foaming reflection plate and then heats and softens the micro foaming reflection plate, and the micro foaming reflection plate going through the hot pressing process is formed into the shape of a reflector, and finally the reflector is formed after a cooling process. Compared with the prior art, most conventional reflectors have a reflective material electroplated onto the reflectors. Therefore, the light cannot be reflected effectively, and thus resulting in a low light efficiency and a reflectivity less than 90%. In the present disclosure, a micro foaming reflection plate processed by an anti-UV process is used for making a reflector, and the reflectivity will reach up to 95%-99%, and the light efficiency can be improved significantly to enhance the lamp brightness. In addition, the micro foaming reflection plate processed by the anti-UV process can improve the service life of the reflector.

In a specific embodiment, the preheat process in the Step B has a temperature of 180-200° C. and a continuous preheat time of 10 seconds. The aforementioned preheat temperature and heating time are parameters of an embodiment only. In this embodiment, the preheat process is taken place at the temperature of 180-200° C. for 5~15 seconds. With the appropriate temperature and preheat time, the micro foaming reflection plate can be prevented from being heated directly to a high temperature, so as to shorten the high-temperature softening time and facilitate the operation of the micro foaming reflection plate and the fixing and cutting operation.

In a specific embodiment, the heating process in the Step C has a temperature of 230~250° C. and a continuous heating time of 5 seconds. The heating temperature falls within a range of 230~250° C. which may be 230° C., 240° C., or 250° C., and the continuous heating time is 5 seconds. Compared with the prior art, the present disclosure can shorten the heating time and improve the processing efficiency.

In a specific embodiment, the Step D further comprises the step of placing the softened micro foaming reflection plate into a hot pressing mold for the hot pressing process to form a required shape of the reflector, wherein a cavity of the micro foaming reflection plate is formed inside the hot pressing mold. In this embodiment, a hot pressing mold is provided for shaping, and we can understand that a desired cavity for molding the micro foaming reflection plate is formed in the hot pressing mold and used for performing the hot pressing process of the softened micro foaming reflection plate, so as to define a specific shape.

In a specific embodiment, the Step D further comprises a preheat process to heat the hot pressing mold to 230~250° C. During the hot pressing process, it is necessary to heat the hot pressing mold. To prevent a drop of the temperature of the micro foaming sheet temperature, the temperature of the hot pressing mold is maintained within 230~250° C. in order to improve the hot pressing effect.

In a specific embodiment, in the anti-UV process of the Step A, a synthetic micro foaming sheet with an anti-UV agent is added into the MCPET material, wherein the MCPET material and the anti-UV agent have a weight ratio of 50000:1. In this embodiment, when the micro foaming sheet with the anti-UV agent is applied to the high-reflectivity reflector, it can be used for a long time under the wavelength of 280-320 nm without the issue of discoloring.

In a specific embodiment, the high-reflectivity reflector has a cross-sectional shape of a square, a circle, or any other shape, and the overall shape of the reflector is substantially the shape of a cone. It is understood that the cross-sectional shape of the reflector may be any one selected from a square shape, a circular shape or any other shape, and the overall shape is the shape of a cone or a cylinder.

Embodiment 2

Figure 2:
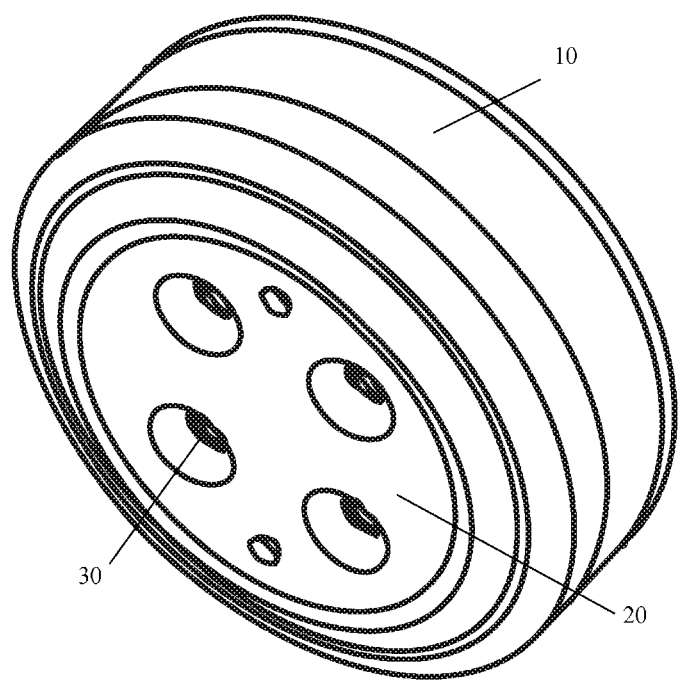
FIG. 2 is a schematic view of a high-reflectivity lamp in accordance with an embodiment of the present disclosure.

With reference to FIG. 2 for a high-reflectivity lamp in accordance with a embodiment of the present disclosure, the high-reflectivity lamp comprises a lamp housing 10 with an accommodating space, a light board installed in the lamp housing, at least one light emitting source 30 installed on the light board, and a reflector 20 disposed in the lamp housing and covered onto the light emitting source, and the reflector 20 is manufactured according to the aforementioned high-reflectivity reflector manufacturing method. Since the reflector of the high-reflectivity lamp of the present disclosure is manufactured according to the aforementioned high-reflectivity reflector manufacturing method, it has all advantages and effects of a high-reflectivity reflector.

In this embodiment, the reflector of the high-reflectivity lamp is made of a high-reflectivity material and capable of improving the light reflection effect of the reflector (when compared with the surface plating technology of the prior art). Tests show that the reflection efficiency of the reflector of this disclosure is over 95%. As to the whole solution, the present disclosure has the features of a reasonable design, a simple structure, and a low manufacturing cost, and can prevent the failure of an effective reflection or the low light utilization efficiency. In addition, this disclosure may be applied to both indoor and outdoor lamps to provide a wide scope of applicability.

While the disclosure has been described by means of specific embodiments, numerous modifications and variations could be made thereto by those skilled in the art without departing from the scope and spirit of the disclosure set forth in the claims.

What is claimed is:

1. A high-reflectivity reflector manufacturing method, comprising the steps of:
   (A) preparing at least one micro foaming reflection plate processed with an anti-UV process;
   (B) performing a preheat process of the micro foaming reflection plate;
   (C) performing a heating process of the micro foaming reflection plate after being processed by the preheat process to soften the micro foaming reflection plate;
   (D) performing a hot pressing process to the softened micro foaming reflection plate to form a required shape of the reflector; and
   (E) cooling the reflector to obtain a high-reflectivity reflector.

2. The high-reflectivity reflector manufacturing method of claim 1, wherein the preheat process in Step B has a temperature of 180~200° C., and a continuous preheat time of 10 seconds.

3. The high-reflectivity reflector manufacturing method of claim 1, wherein the heating process in the Step C has a temperature of 230~250° C., and a continuous heating time is 5 seconds.

4. The high-reflectivity reflector manufacturing method of claim 1, wherein the Step D further comprises the step of placing the softened micro foaming reflection plate into a hot pressing mold for the hot pressing process to form a required shape of the reflector, wherein a cavity of the micro foaming reflection plate is formed inside the hot pressing mold.

5. The high-reflectivity reflector manufacturing method of claim 4, wherein the Step D further comprises a preheat process to heat the hot pressing mold to 230~250° C.

6. The high-reflectivity reflector manufacturing method of claim 1, wherein in the anti-UV process of the Step A, an anti-UV agent is added into a MCPET material to form a synthetic micro foaming sheet, and the MCPET material and the anti-UV agent have a weight ratio of 50000:1.

7. The high-reflectivity reflector manufacturing method of claim 1, wherein the high-reflectivity reflector has a cross-sectional shape selected from the group consisting of a square shape, a circular shape, and any other shape, and the reflector has an overall shape of a cone.

8. A high-reflectivity lamp, comprising a lamp housing with an accommodating space, a light board installed in the lamp housing, at least one light emitting source installed on the light board, and a reflector disposed in the lamp housing and covered onto the light emitting source, and the reflector being manufactured by the high-reflectivity reflector manufacturing method of claim 1.

\* \* \* \* \*